(12) United States Patent
Straw, Sr. et al.

(10) Patent No.: US 6,446,937 B1
(45) Date of Patent: Sep. 10, 2002

(54) REMOVABLE GEAR DRIVE FOR MECHANICAL JACK

(75) Inventors: Shane A. Straw, Sr., Plover; Christopher M. Morris, Schofield, both of WI (US)

(73) Assignee: Fulton Performance Products, Inc., Mosinee, WI (US)

( * ) Notice: Subject to any disclaimer, the term of this patent is extended or adjusted under 35 U.S.C. 154(b) by 0 days.

(21) Appl. No.: 10/024,927

(22) Filed: Dec. 19, 2001

Related U.S. Application Data

(60) Provisional application No. 60/336,151, filed on Nov. 15, 2001.

(51) Int. Cl.⁷ .................................................. G60S 9/02
(52) U.S. Cl. ......................... 254/425; 254/103; 248/352
(58) Field of Search ................................ 254/103, 425, 254/98, 99, 100, 133, 134, 420; 248/352

(56) References Cited

U.S. PATENT DOCUMENTS

| | | | |
|---|---|---|---|
| 2,464,890 A | | 3/1949 | Premo |
| 2,499,625 A | | 3/1950 | Black |
| 3,489,395 A | | 1/1970 | Glassmeyer |
| 3,632,086 A | | 1/1972 | Mai |
| 3,904,177 A | * | 9/1975 | Dalton ........................ 254/103 |
| 4,483,515 A | * | 11/1984 | Maryonovich ............... 254/103 |
| 4,796,864 A | | 1/1989 | Wilson |
| 5,199,738 A | * | 4/1993 | VanDenberg ............. 280/766.1 |
| 5,273,256 A | | 12/1993 | Chambers |
| 5,423,518 A | | 6/1995 | Baxter et al. |
| 5,553,825 A | | 9/1996 | Rasmussen |
| 5,906,356 A | | 5/1999 | Stratman |
| 6,099,016 A | | 8/2000 | Peveler |

* cited by examiner

*Primary Examiner*—Joseph J. Hail, III
*Assistant Examiner*—Daniel Shanley
(74) *Attorney, Agent, or Firm*—Robert H. Earp, III; McDonald, Hopkins, Burke & Haber, LPA

(57) ABSTRACT

A jack assembly for raising and lowering an object such as a trailer. The jack includes telescoping jack tubes which are expanded and contracted through operation of an axial screw. The screw is drivably connected to a gear drive mounted in an upper end of the jack. A crankshaft is supported within the upper end of the jack tube by a pair of end bushings and includes a hexagonal intermediate portion. A first pinion gear having a hexagonal throughbore is drivably mounted to the intermediate portion of the crankshaft. The first gear is in driving engagement with a screw gear connected to the axial screw. At least one of the end bushings is removable to facilitate disassembly of the gear drive. Rotation of the crank transmits rotation to the crankshaft and the first pinion gear in turn transmitting rotation to the screw gear and the axial screw for telescoping movement of the jack.

18 Claims, 5 Drawing Sheets

United States Patent 6,446,937 B1

REMOVABLE GEAR DRIVE FOR MECHANICAL JACK

RELATED APPLICATIONS

This application claims priority from U.S. Provisional Application No. 60/336,151 filed on Nov. 15, 2001.

BACKGROUND OF THE INVENTION

I. Field of The Invention

This invention relates to a mechanical jack for raising and lowering an object such as a trailer and, in particular, to a gear drive for the jack which can be readily assembled within the jack tube and, if necessary disassembled for repair or replacement.

II. Description of the Prior Art

Mechanical jacks are convenient devices for raising and lowering a portion of a vehicle such as the tongue or forward portion of a trailer. The forward portion may need to be raised or lowered to level the trailer or to position the trailer coupler for connection to the towing vehicle. Typical jacks include telescoping sections, the extension and retraction of which is controlled by an axial screw extending through the housing and drivably engaging a screw nut. Rotation of the screw within the jack may be controlled directly by a crank or through a gear assembly drivably connecting the crank to the screw. Rotation of the crank in one direction rotates the screw causing expansion of the jack sections as the screw nut travels along the screw. Conversely, rotation of the crank in the opposite direction causes contraction of the jack sections as the screw nut travels along the screw in the opposite direction.

The gear drive for the jack includes a first beveled gear mounted to the crankshaft and a second cooperating gear mounted to the axial screw such that rotation of the crank is transmitted to the screw. The cooperation of the components within the jack tube creates difficulty in assembly particularly for components which need to be secured within these limited spaces. In some prior known assemblies the beveled gear would have to be fastened to the crankshaft once assembled within the jack tube. This fastening also reduced the ability to disassemble the gear drive.

SUMMARY OF THE PRESENT INVENTION

The present invention overcomes the disadvantages of the prior known jack assemblies by providing a gear drive which is readily assembled within the jack tube yet has sufficient durability for heavy-duty applications.

The gear drive assembly of the present invention facilitates insertion and assembly of the gear drive components within the limited space of a jack tube without the need for precision insertion of small components such as drive pins. The gear drive assembly is mounted within an upper end of a jack tube and is drivably connected to an axial jack screw extending through the tube. The gear drive assembly of the present invention is driven by a side crank requiring that the rotational motion be transmitted at a right angle. The crank is connected to a crankshaft extending laterally through the jack tube and supported by opposite walls of the tube. The crankshaft includes an intermediate portion having a hexagonal configuration although any non-circular configuration may be employed.

The crankshaft is supported in the opposite walls of the jack tube by bushings which receive the circular end portions of the crankshaft such that the shaft will rotate in the fixed bushings. A first bushing is inserted into the wall of the jack tube from the interior of the tube while the second bushing is inserted into the opposite wall from the exterior to secure the entire drive assembly. A first beveled gear is mounted to the hexagonal portion of the crankshaft. Rotation of the crankshaft is therefore transmitted to the first gear through the hexagonal portion of the shaft. The hexagonal portion has a diameter of the circular end portions and the inner diameter of the bushings thereby preventing the hexagonal portion from moving into the bushings.

The first gear drivably engages a second beveled gear axially aligned with the jack screw whereby rotation of the second gear is transmitted directly to the screw. The second gear is carried on a removable plate extending across the jack tube and connected directly to the jack screw. With the second beveled gear mounted to the screw, the first bushing is inserted into the tube wall from the interior of the jack tube and the first gear is positioned in driving engagement with the second gear with its throughbore aligned with the bushing. The crankshaft is then inserted transversely through the jack tube and the aligned bushing and gear until the hexagonal intermediate portion of the gear is received within the first gear and engages the bushing. The exterior bushing is placed over the end of the crankshaft and fastened to the jack tube to secure the gear drive assembly.

Other objects, features and advantages of the invention will be apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF THE PREFERRED EMBODIMENT OF THE PRESENT INVENTION

Figure 1:
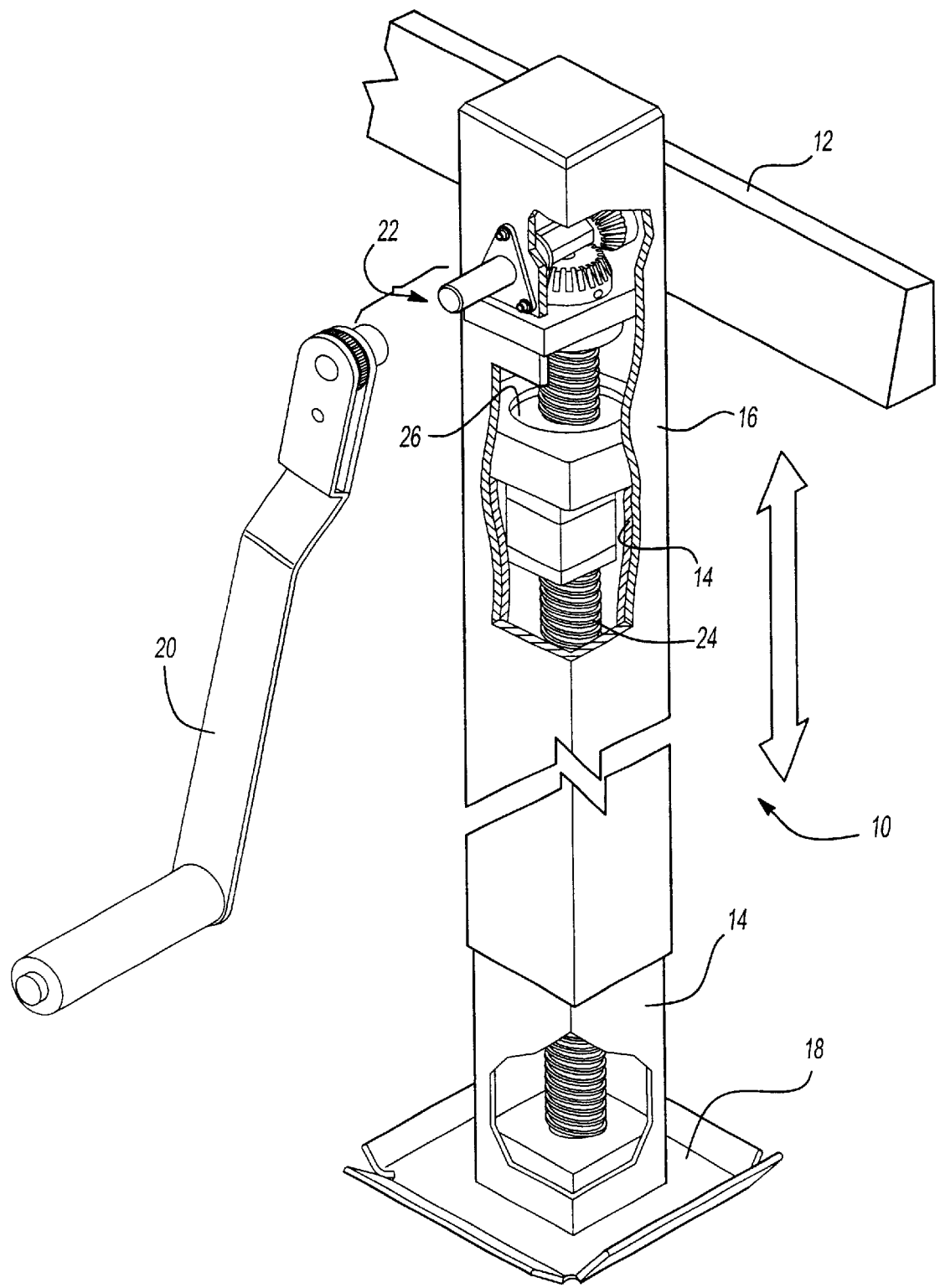
FIG. 1 is a perspective view of a jack embodying the gear drive assembly of the present invention.
Figure 2:
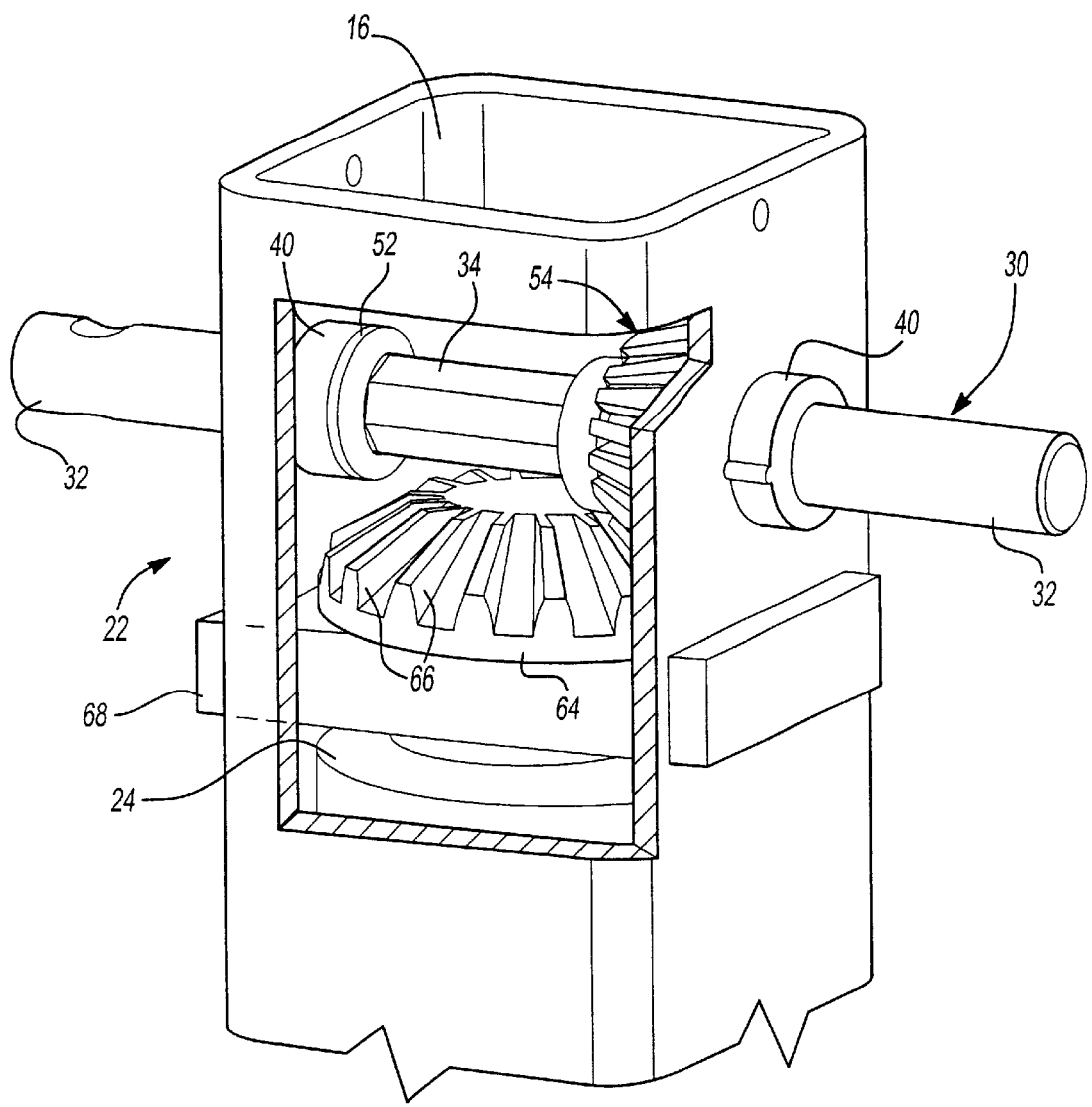
FIG. 2 is an enlarged perspective view of an upper end of the jack showing the gear drive assembly.
Figure 3:
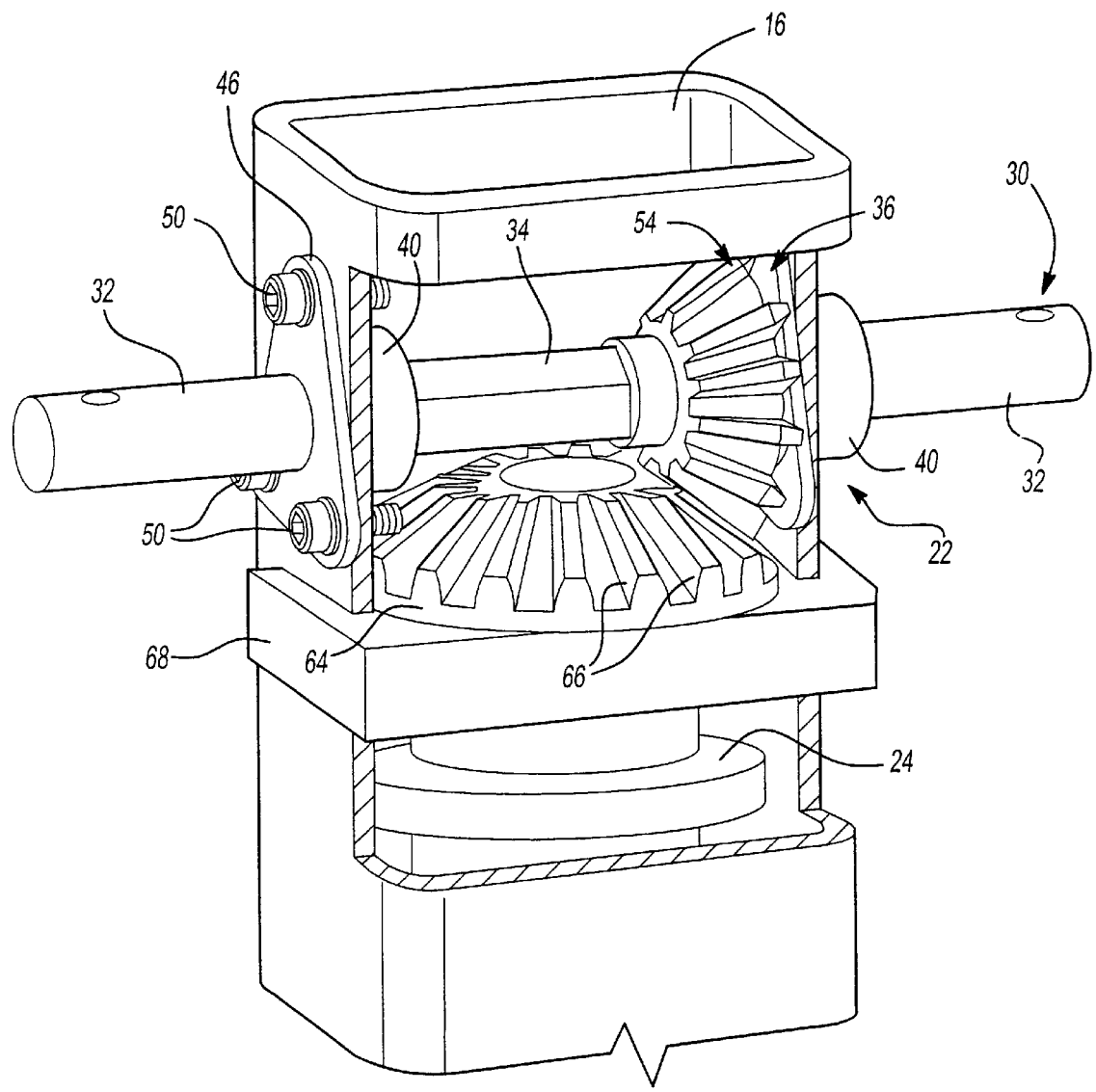
FIG. 3 is a side view thereof.
Figure 4:
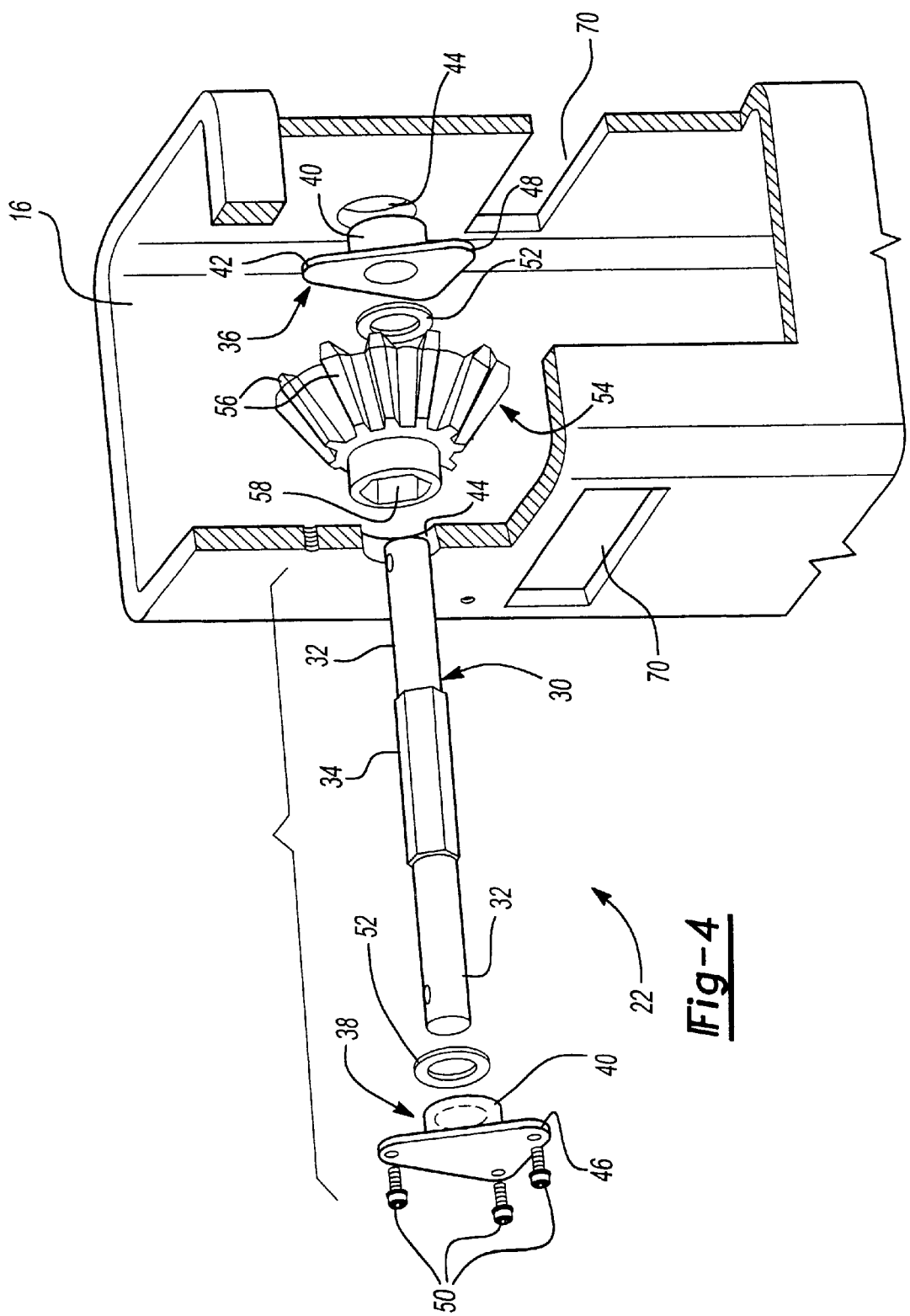
FIG. 4 is an exploded view of the gear drive assembly.

Referring first to FIG. 1, there is shown a jack assembly 10 selectively extendable and contractible to raise and lower a structure 12 such as a portion of a recreational vehicle. The recreational vehicle may need to be raised or lowered for leveling or to facilitate attachment to a towing vehicle. The jack assembly 10 generally includes a lower jack tube 14 telescopically received within an upper jack tube 16. A ground engaging footpad 18 may be attached to the lower tube 14 while the upper tube 16 is secured to the structure 12 in a well known manner. In accordance with the present invention, an external crank 20 is used to operate the jack 10 to raise and lower the structure 12 as desired.

The crank 20 is operatively connected to a gear drive assembly 22 embodying the present invention which is drivably connected to a jack screw 24 extending axially through the tubes 14,16. The jack screw 24 extends through and is threadably connected to a screw nut 26 secured to the lower tube 14. Rotation of the jack screw 24 in a first direction will drive the screw nut 26 downwardly to telescopically expand the jack assembly 10 and rotation of the jack screw 24 in an opposite second direction will draw the screw nut 26 upwardly along the screw 24 to telescopically contract the jack assembly.

Referring now to FIGS. 2 through 6, the gear drives assembly 22 of the present invention is designed to transmit rotation of the crank 20 to the jack screw 24 for telescopic operation of the jack 10. The crank 20 is connected to a crankshaft 30 which extends transversely through the upper jack tube 16. The crankshaft 30 includes cylindrical end portions 32 and an intermediate portion 34 which has a non-circular cross-sectional configuration. In a preferred embodiment of the present invention, the non-circular intermediate portion 34 is hexagonal and has a diameter greater than the diameter of the end portions 32. However, any non-circular configuration may be employed as a drive segment for the crankshaft 30. The ends 32 of the crankshaft 30 are rotatably supported within the tube 16 by first bushing 36 and second bushing 38. Each of the bushings 36,38 have a hub 40 with a throughbore 42 corresponding to the diameter of the end portions 32 of the crankshaft 30. The hubs 40 have an external diameter corresponding to apertures 44 formed in opposite walls of the tube 16 so as to be supported within the apertures 44. A flange 46 limits the extent the bushings 36,38 extend through the respective aperture 44.

The first bushing 36 is mounted from the interior of the tube 16 and includes an anti-rotation lobe 48 which will prevent the interior bushing 36 from spinning within the aperture 44. The second bushing 38 is secured to the tube 16 using fasteners 50 passing through the flange 46 to engage the tube 16. The larger diameter of the intermediate hexagonal portion 34 prevents the intermediate portion 34 from traveling into the bushings 36,38. However, to prevent wear on the hex portion 34 as it rotates against the bushings 36,38 thrust washers 52 are inserted at the ends of the hex portion 34.

Figure 5:
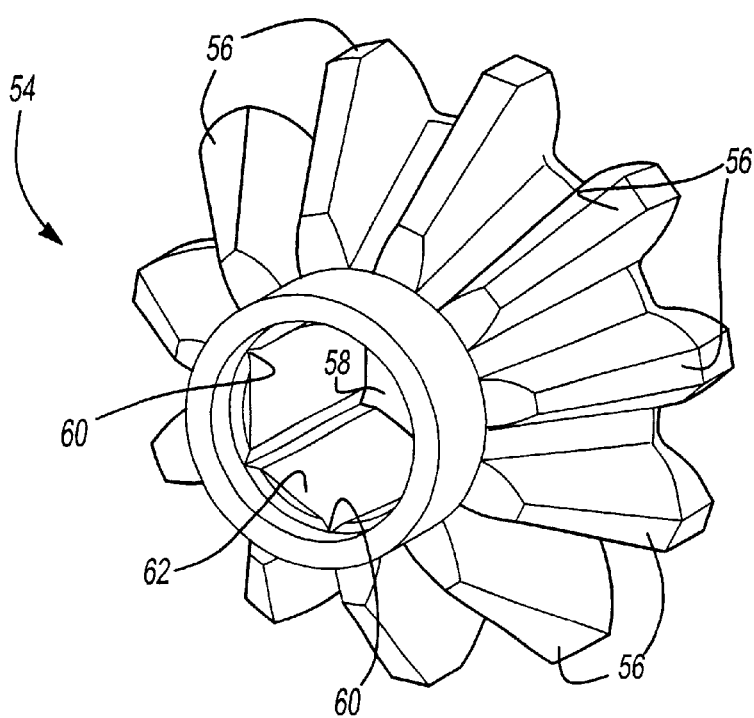
FIG. 5 is a perspective view of the first gear of the drive assembly.
Figure 6:
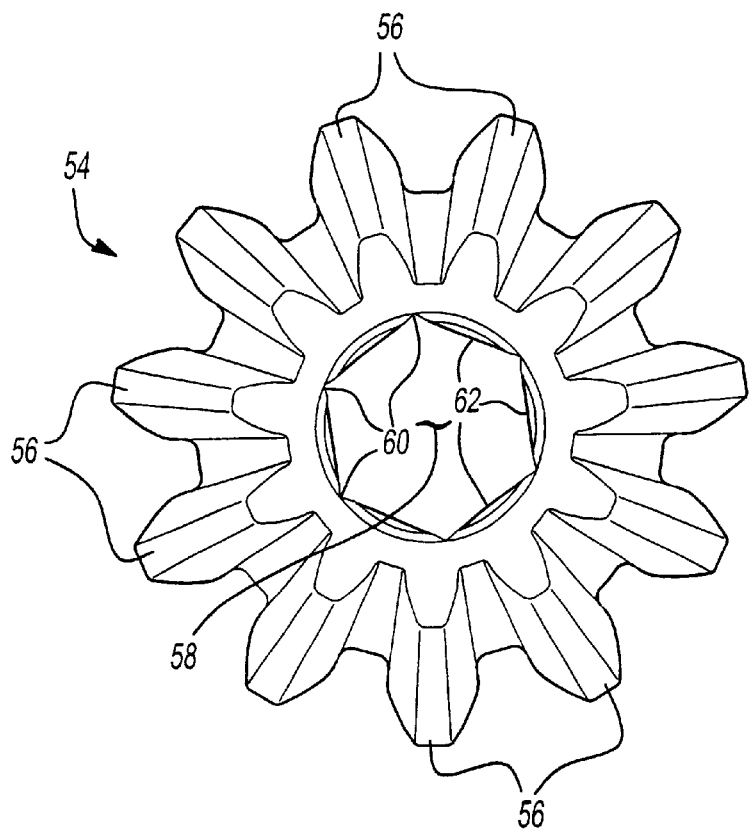
FIG. 6 is an end view of the first gear.

Drivably mounted to the intermediate portion 34 of the crankshaft 30 is a first drive gear 54. As is well known, the gear 54 is beveled with a plurality of gear teeth 56 and an axial throughbore 58 for receiving the crankshaft 30. In accordance with the present invention, the configuration of the throughbore 58 matches the cross-sectional configuration of the non-circular intermediate portion 34 of the crankshaft. In this manner, rotation of the crankshaft 30 is transmitted directly to the first gear 54 and it is not necessary to fasten the gear 54 to the crankshaft 30 as is required in other drive systems. As is best shown in FIGS. 5 and 6, the hexagonal throughbore 58 has a plurality of relief cavities 60 formed at the corners of the bore 58. The cavities 60 are intended to reduce stress on the corners or tips of the hexagonal shaft portion 34 and concentrate the rotational force against the flat surfaces 62 of the bore 58 within the gear 54.

The first gear 54 drivably engages a second gear 64 which is directly axially connected to the jack screw 24. The second gear 64 is also beveled with a plurality of gear teeth 66 which interact with the gear teeth 56. The second gear 64 is supported at a right angle to the first gear 54 on a removable platform 68 which extends through the jack tube 16. The platform 68 is inserted transversely through the tube 16 through opposing slots 70.

The gear drive assembly 22 of the present invention facilitates simple assembly within the jack assembly 10 and, if necessary, disassembly for repair or replacement of components. The first interior bushing 36 is inserted into the corresponding aperture 44 in the tube wall 16 and the lobe 48 aligned to prevent rotation. One end 32 of the crankshaft 30 is fed through the opposing aperture 44 and the first gear 54 then thrust washer 52 are slid over the end 32 of the shaft 30 as that same end is fed through the throughbore 42 of the interior bushing 36. The crankshaft 30 will travel through the tube 16 until the intermediate portion 34 engages the thrust washer 52 and the thrust washer 52 engages the bushing 36 preventing further lateral movement. The other thrust washer 52 and the exterior bushing 38 can then be slid over the end of the crankshaft 30 until the washer 52 engages the hex portion 34 of the shaft 30 and the flange 46 of the exterior bushing 38 engages the wall of the jack tube 16. With the hub 40 in the aperture 44, the fasteners 50 can be used to secure the exterior bushing 38 to the jack tube 16. The crankshaft 30 and first gear 54 will essentially be captured between the bushings 36 and 38. Furthermore, the input or first gear 54 is positionally captured between the bushing 36 in one direction and interference with the drive or second gear 64 in the other direction.

Once the crank 20 is attached to one or both of the end portions 32 of the crankshaft 30, rotation of the crank 20 will rotate the crankshaft 30 thereby rotatably driving the first gear 54. Rotation of the first gear 54 is transmitted to the second gear 64 and the jack screw 24 to extend or contract the jack assembly.

The foregoing detailed description has been given for clearness of understanding only and no unnecessary limitations should be understood therefrom as some modifications will be obvious to those skilled in the art without departing from the scope and spirit of the appended claims.

What is claimed is:

1. A selectively extensible jack assembly comprising:
    a telescopically adjustable housing having means for controlling the telescoping movement of said housing;
    a drive assembly positioned within said housing and drivably connected to said means for controlling the telescoping movement of said housing; and
    a crank operatively connected to said drive assembly;
    said drive assembly including a crankshaft supported within said housing, said crankshaft having a portion thereof with a non-circular cross-sectional configuration, a first drive gear drivably mounted to said non-circular portion of said crankshaft, and a second drive gear drivably engaging said first drive gear, said second drive gear connected to said means for controlling telescoping movement of said housing.

2. The jack assembly as defined in claim 1 wherein said non-circular portion of said crankshaft has a hexagonal cross-sectional configuration.

3. The jack assembly as defined in claim 2 wherein said first drive gear has an axial throughbore with a configuration corresponding to said non-circular configuration of said crankshaft.

4. The jack assembly as defined in claim 3 wherein said throughbore of said first drive gear has cavities formed at corners of said bore.

5. The jack assembly as defined in claim 1 wherein said non-circular portion of said crankshaft is an intermediate portion between cylindrical end portions.

6. The jack assembly as defined in claim 5 wherein said crankshaft is supported in said housing by a first interior bushing seated within a first wall of said housing and a second exterior bushing seated within a second opposing wall of said housing, said cylindrical end portions rotatably supported in said first and second bushings.

7. The jack assembly as defined in claim 6 wherein said intermediate portion of said crankshaft has a larger diameter than said cylindrical end portions such that said intermediate portion is positionally captured between said bushings mounted to said housing.

8. The jack assembly as defined in claim 7 wherein said first interior bushing has a lobe for preventing rotation of said first bushing within said housing wall.

9. The jack assembly as defined in claim 8 wherein said second bushing is fastened to said housing to secure said drive assembly within said housing.

10. A selectively extensible jack assembly comprising:

a lower jack tube having a ground engaging member;

an upper jack tube telescopically receiving said lower jack tube, said upper jack tube adapted to be secured to a structure;

a jack screw extending axially through said upper and lower jack tubes, said jack screw engaging said lower tube for telescoping movement thereof upon rotation of said jack screw;

a drive assembly positioned within said upper jack tube and drivably connected to said jack screw; and a crank operatively connected to said drive assembly;

said drive assembly including:

a crankshaft supported within said housing, said crankshaft having an intermediate portion with a non-circular cross-sectional configuration and end portions supported in said upper jack tube;

a first drive gear drivably mounted to said non-circular intermediate portion of said crankshaft; and a second drive gear drivably engaging said first drive gear and connected to said jack screw.

11. The jack assembly as defined in claim 10 wherein said non-circular portion of said crankshaft has a hexagonal cross-sectional configuration.

12. The jack assembly as defined in claim 11 wherein said first drive gear has an axial throughbore with a configuration corresponding to said non-circular configuration of said crankshaft.

13. The jack assembly as defined in claim 12 wherein said throughbore of said first drive gear has cavities formed at corners of said bore.

14. The jack assembly as defined in claim 13 wherein said non-circular portion of said crankshaft is an intermediate portion between cylindrical end portions.

15. The jack assembly as defined in claim 14 wherein said crankshaft is supported in said housing by a first interior bushing seated within a first wall of said housing and a second exterior bushing seated within a second opposing wall of said housing, said cylindrical end portions rotatably supported in said first and second bushings.

16. The jack assembly as defined in claim 15 wherein said intermediate portion of said crankshaft has a larger diameter than said cylindrical end portions such that said intermediate portion is positionally captured between said bushings mounted to said housing.

17. The jack assembly as defined in claim 16 wherein said first interior bushing has a lobe for preventing rotation of said first bushing within said housing wall.

18. The jack assembly as defined in claim 17 wherein said second bushing is fastened to said housing to secure said drive assembly within said housing.

* * * * *